H. F. & H. G. WEINLAND.
ROTARY MOTOR FOR DRIVING BOILER TUBE CLEANERS.
APPLICATION FILED JULY 29, 1908.
978,088.
Patented Dec. 6, 1910.
2 SHEETS—SHEET 1.
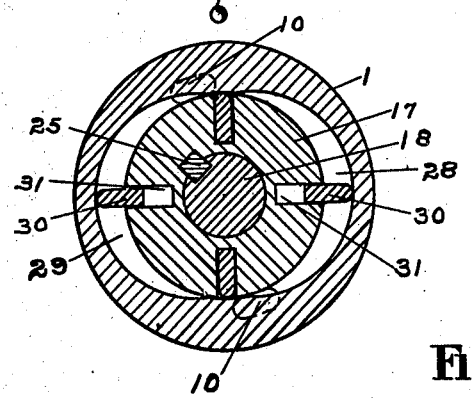
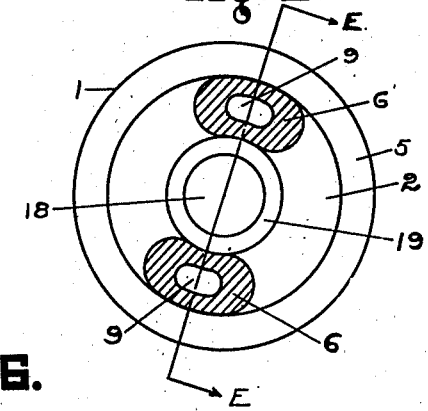
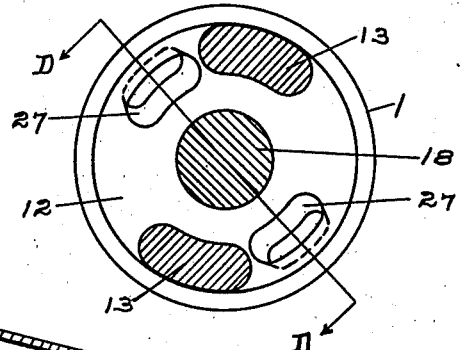
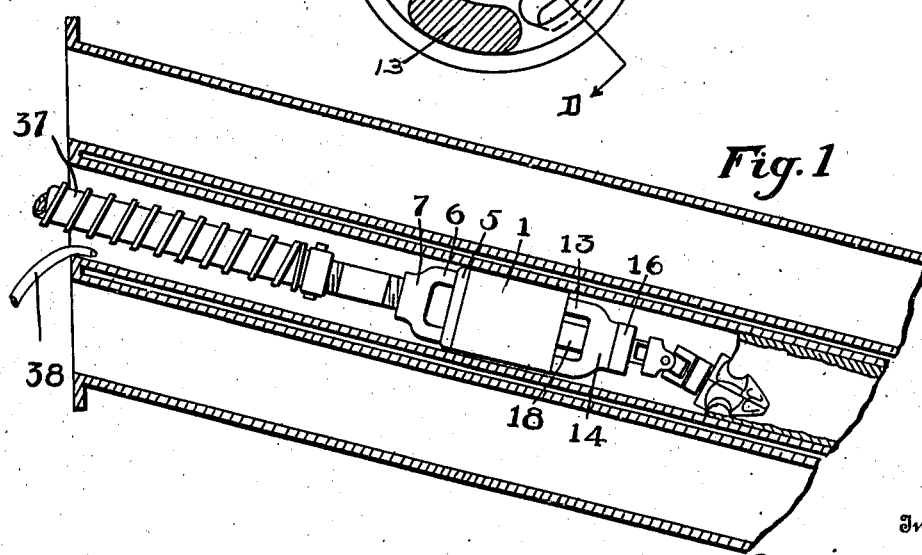

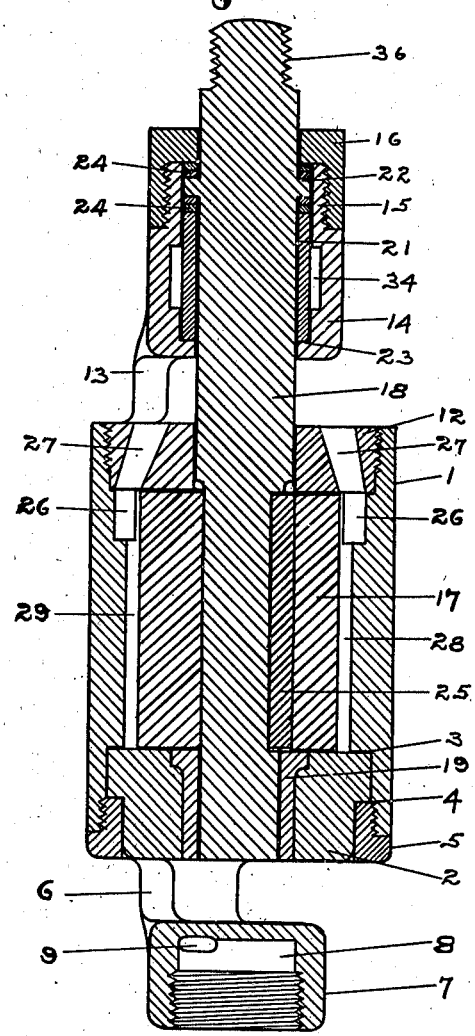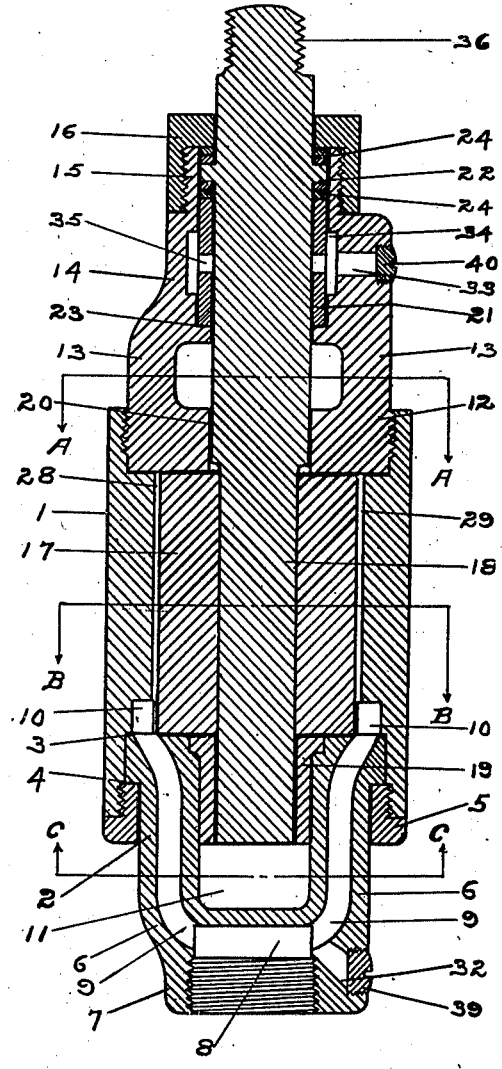

UNITED STATES PATENT OFFICE.

HENRY F. WEINLAND AND HERMON G. WEINLAND, OF SPRINGFIELD, OHIO, ASSIGNORS TO THE LAGONDA MANUFACTURING COMPANY, OF SPRINGFIELD, OHIO, A CORPORATION OF OHIO.

ROTARY MOTOR FOR DRIVING BOILER-TUBE CLEANERS.

978,088.   Specification of Letters Patent.   Patented Dec. 6, 1910.

Application filed July 29, 1908. Serial No. 445,950.

*To all whom it may concern:*

Be it known that we, HENRY F. WEINLAND and HERMON G. WEINLAND, citizens of the United States, residing at Springfield, in the county of Clark and State of Ohio, have invented certain new and useful Improvements in Rotary Motors for Driving Boiler-Tube Cleaners, of which the following is a specification, reference being had therein to the accompanying drawings.

Our invention relates to rotary motors and more especially to a motor operated by air for cleaning boiler tubes although it may be driven by steam and may be used for other purposes.

The object of our invention is to provide a simple, strong and effective motor of few parts and easy to operate. A motor of this character runs at a very high speed and is subject to severe shocks and strains. To meet these requirements two exceptionally strong bearings are provided and to obtain greater stability the distance between them is increased by having the front bearing carried in a bracket extending outwardly from the front head, the construction being such that this bearing is cooled by the exhaust from the motor. A like bracket extends from the rear or feed head leaving the rear bearing exposed to be cooled by water which accumulates back of the motor, the best practice requiring that where air motors are employed to introduce water under pressure into the tube being cleaned to wash the disintegrated scale from the tube.

A further object is to provide means in the front bearing to take the end thrust in both directions.

With these and other objects in view our invention consists of the constructions and combinations hereinafter described and set forth in the claims.

In the accompanying drawings Figure 1 is a motor embodying our invention shown in operative position in the tube of a boiler. Fig. 2 is a longitudinal section of the motor taken on the line D D of Fig. 6 through the exhaust ports looking in the direction of the arrows. Fig. 3 is a longitudinal section of the motor on the line E E of Fig. 5 through the inlet ports looking in the direction of the arrows. Fig. 4 is a cross section of the motor on the line B B of Fig. 3 looking in the direction of the arrows. Fig. 5 is a cross section of the motor on the line C. C. of Fig. 3 looking in the direction of the arrows. Fig. 6 is a cross section of the motor on the line A. A. of Fig. 3 looking in the direction of the arrows.

Like numerals represent the same parts in the several views.

In the drawings 1 represents the casing of a motor having a removable head 2 seated against an internal shoulder 3 of the casing, the head being made with a shoulder 4 against which a ring 5 screw threaded into the casing as shown is adapted to bear to hold the head in place. Said head is provided with outwardly extending arms 6 forming a bracket terminating in a hub 7 having a recess or chamber 8 with a screw threaded opening as shown to which the feed hose 37 is secured. Ports 9 lead from said chamber in the hub through the arms and head to ports 10 in the casing that open into the casing chambers, the construction being such as to leave an open space 11 between the head and hub for the purpose hereinafter described. An exhaust head 12 is shown screw threaded directly into the casing and is provided with outwardly extending arms 13 forming a bracket terminating in a hub 14 with a reduced portion 15 and a cap 16 screw threaded thereon as shown, the construction being such as to leave an open space between the head and hub for the purpose hereinafter described.

A runner 17 is mounted on a shaft 18, the rear end of which is journaled in an opening through the feed head 2, a bushing 19 being preferably provided to form a bearing therefor; and the forward end of the shaft projects through an opening 20 in the exhaust head 12 and further extends through an opening in the hub 14, a bearing being formed therein to carry the shaft and to take the end thrust in both directions. A removable bushing 21 is preferably provided to form the bearing for the shaft and the shaft has a collar 22 thereon preferably formed integrally therewith; the bushing rests against a shoulder 23 of the hub and takes the end thrust in one direction and the cap 16 in the other; and spacing washers 24 are preferably provided between the collar and the bushing and cap. A key 25 fixed on the shaft 18 and loosely fitting in a recess in the runner 17 allows the shaft to move longitudinally through the runner so that when the spacing washers 24 become worn the shaft will have necessary play through the runner to prevent the end thrust binding the runner in either end of its chamber as would be the case if the runner were fixed on the shaft.

Ports 26 in the casing register with the ports 27 of the head 12, said last named ports being made larger at the outer end as shown and given an inwardly inclined direction to discharge against the hub 14 so that when air is used as the motive agent it will cool the bearing in the hub.

A chamber of such form and dimensions is provided in the casing 1 that when the runner 17 is mounted therein it will contact the walls of the chamber in two places opposite each other forming two oppositely disposed crescent shaped chambers 28 and 29 as particularly shown in Fig. 4. Paddles 30 are seated in recesses 31 of the runner 17 and are adapted to move radially into the chambers 28 and 29 in a well known manner.

The operation of the motor will be readily understood, the actuating medium being introduced through the ports 9 and 10 to the chambers 28 and 29, move the paddles through the chambers and escapes through the exhaust ports 26 and 27, the paddles successively operating through each of the chambers in like manner to rotate the runner.

In motors of this character where the paddles move radially against the walls of the chamber it has been found that the paddles wear or cut the walls of the chamber and destroy the efficiency of the motor and shorten its life. To overcome this we case harden the walls of the chamber and make the paddles of softer metal whereby the tendency to cut the walls is almost if not entirely eliminated. The paddles take the wear, give a good length of service and can be readily replaced at small cost. Furthermore we preferably provide four of the paddles which when equally spaced from each other brings them into operative position so that the runner is given substantially a constant torque throughout its revolution and avoids dead center.

Where air is employed as the motive agent and the motor is used for driving boiler tube cleaners it has been found that the exhaust air is not sufficient to carry off the disintegrated scale and the work is very much facilitated by introducing into the tube being cleaned water under pressure and we have shown in Fig. 1 a feed water hose 38 leading from suitable source of supply for this purpose. The water accumulates back of the motor before passing between the motor casing and tube and the space between the head 2 and hub 7 leaves said head, the end of the shaft 18 and its bearing 19 exposed to the water by which they are cooled; and further the water in passing aids the discharge from the motor in cooling the front bearing.

An oil hole 32 through the hub 7 provides means to introduce a lubricant to the chamber 8 and it is carried by the motive agent to lubricate the runner, its paddles and the rear bearing of the shaft; and a screw plug 39 is provided to close said hole. An oil hole 33 through the hub 14 leads to an angular chamber 34 about the bushing 21 formed by recess in the hub, said bushing having openings 35 to admit the lubricant to the shaft; and a screw plug 40 is provided to close said hole.

The cleaner or other machine to be driven can be secured to the screw threaded end 36 of the shaft.

Having thus described our invention, we claim:

1. In a rotary motor, a casing, a runner, a driving shaft, a feed head, a front head having an outwardly extending bracket, a bearing carried by the bracket, said bracket having an open space between the head and bearing and exhaust ports through the head adapted to discharge against said bearing, substantially as described.

2. In a rotary motor, a casing, a runner, a driving shaft, a feed head, a discharge head having an outwardly extending bracket with a bearing for the shaft, said bracket being formed with an open space between the head and bearing, substantially as described.

3. In a rotary motor, a casing, a runner, a driving shaft, a feed head, a discharge head having an outwardly extending bracket with a bearing in which said shaft is journaled and abutting portions on said shaft and bracket to take the end thrust in both directions, said bracket being formed with an open space between the head and bearing, substantially as described.

4. In a rotary motor, a casing, a runner, a driving shaft having a collar thereon, a feed head, a front head with an outwardly extending bracket terminating in a hub like portion having an internal shoulder, a removable bushing forming a bearing for the shaft and adapted to abut on said shoulder to take the end thrust on the collar in one direction and a cap secured to said hub adapted to take the end thrust in the opposite direction, said bracket having an open space between said head and hub portion and exhaust ports through said head adapted to discharge against said hub bearing portion, substantially as described.

5. In a rotary motor, a casing, a runner, a driving shaft having a collar thereon, a feed head, a front head removably secured to the casing with an outwardly extending bracket terminating in a hub like portion having an internal shoulder and an exterior screw threaded reduced portion, a removable bushing forming a bearing for the shaft adapted to abut on said shoulder and take the end thrust on the shaft collar in one direction, a cap adapted to be screwed on said reduced portion and to take the end thrust in the opposite direction, spacing rings interposed between said shaft collar and the bushing and cap, said hub having an annular chamber about said bushing, a feed hole to said chamber, the bushing having openings from the chamber to the shaft, said bracket having an open space between the head and hub and exhaust ports through said heads adapted to discharge against said hub bearing portion, substantially as described.

6. In a rotary motor, such as described, a runner, a casing forming a chamber for the runner, a head therefor, having an outwardly extending bracket formed with one or more arms terminating in a hub having a chamber for the motive agent supply and ports through the head and arm or arms leading from said hub chamber to the casing chamber, substantially as described.

7. In a rotary motor such as described, a runner, a casing forming a chamber for the runner, a head therefor having an outwardly extending bracket formed with one or more arms terminating in a hub having a chamber for the motive agent supply and ports through the head and arm or arms leading from the hub chamber to the casing chamber, a driving shaft and a bearing in said head for the shaft, said bracket forming an open space between said head and hub exposing said bearing, substantially as described.

8. In a rotary motor such as described, a runner, a casing forming a chamber for the runner, a removable head therefor having an outwardly extending bracket formed with one or more arms terminating in a hub having a chamber adapted to receive the motive supply and ports through the head and arm or arms leading from the hub chamber to the casing chamber, a driving shaft and a removable bearing in the head for the shaft, said bracket forming an open space between the head and hub exposing said bearing, substantially as described.

9. In a rotary motor such as described, a casing having a shoulder in the bore or chamber thereof, a head with an outwardly extending bracket formed of one or more arms terminating in a hub having a chamber to receive the motive agent and ports leading from said hub chamber through the arm or arms and head to the casing chamber, said head being adapted to rest against the shoulder of the casing, a shoulder on the head and a binding ring secured to the casing and adapted to rest against the shoulder of the head to hold the head in place, substantially as described.

10. In a rotary motor such as described, a runner, a casing forming a chamber for the runner, a head therefor having an outwardly extending bracket formed with one or more arms terminating in a hub having a chamber to receive the motive agent and ports leading from said chamber through the arm or arms and head to the casing chamber, said hub having a feed hole from the exterior thereof to the chamber therein to introduce a lubricant, substantially as described.

11. In a rotary motor, a runner, a driving shaft, a casing forming a chamber for the runner with feed and discharge heads at opposite ends thereof, an exposed bearing in the feed head, said discharge head having an outwardly extending bracket with a bearing for the shaft, said bracket being formed with an open space between the head and bearing, substantially as described.

12. In a rotary motor, a runner, a driving shaft, a casing forming a chamber for the runner with feed and discharge heads at opposite ends thereof, an exposed bearing in the feed head, said discharge head having an outwardly extending bracket with a bearing in which said shaft is journaled and abutting portions on said shaft and bracket to take the end thrust in both directions, said bracket being formed with an open space between the head and bearing, substantially as described.

13. In a motor such as described, a casing, a runner, a driving shaft rotated by the runner and adapted to move longitudinally therethrough, said shaft having a collar thereon, a front head with an outwardly extending bracket terminating in a hub having an internal shoulder, a removable bushing forming a bearing for the shaft and adapted to abut on said shoulder to take the end thrust on the collar in one direction and a cap secured to said hub adapted to take the end thrust in the opposite direction and spacing washers interposed between said collar and the bushing and cap, substantially as described.

In testimony whereof, we hereunto affix our signatures in the presence of two witnesses.

HENRY F. WEINLAND.
HERMON G. WEINLAND.

Witnesses:
CARL CASKEY,
GROVER ILGEN.